(12) United States Patent
Pot et al.

(10) Patent No.: US 11,083,334 B2
(45) Date of Patent: Aug. 10, 2021

(54) SUPPORTING FOOT DEPLOYING AND RETRACTING STRUCTURE OF PORTABLE BARBECUE

(71) Applicant: STUDIO CQ (GUANGZHOU) LTD, Guangzhou (CN)

(72) Inventors: Matthijs Pot, Guangzhou (CN); Arvid Bouman, Guangzhou (CN); Dennis Goossens, Guangzhou (CN)

(73) Assignee: STUDIO CQ (GUANGZHOU) LTD, Guangzhou (CN)

( * ) Notice: Subject to any disclaimer, the term of this patent is extended or adjusted under 35 U.S.C. 154(b) by 44 days.

(21) Appl. No.: 16/414,795

(22) Filed: May 17, 2019

(65) Prior Publication Data
US 2019/0269275 A1     Sep. 5, 2019

Related U.S. Application Data

(63) Continuation of application No. PCT/CN2017/111287, filed on Nov. 16, 2017.

(30) Foreign Application Priority Data

Nov. 17, 2016   (CN) .......................... 201621233899.2

(51) Int. Cl.
A47J 37/07         (2006.01)

(52) U.S. Cl.
CPC .......... *A47J 37/0786* (2013.01); *A47J 37/07* (2013.01); *A47J 2037/0777* (2013.01)

(58) Field of Classification Search
CPC ............... A47J 37/0763; A47J 37/0731; A47J 2037/0777; F24B 1/202; F24C 1/16; F24C 7/10
(Continued)

(56) References Cited

U.S. PATENT DOCUMENTS

2005/0252504 A1    11/2005   Cabrera et al.
2015/0114383 A1*   4/2015    Lin ..................... A47J 37/0664
                                                      126/25 R

FOREIGN PATENT DOCUMENTS

CN         102860762 A      1/2013
CN         203207841 U      9/2013
(Continued)

OTHER PUBLICATIONS

International Search Report issued in corresponding International application No. PCT/CN2017/111287, dated Feb. 14, 2018(4 pages).

*Primary Examiner* — Vivek K Shirsat

(57) ABSTRACT

The present application discloses a supporting foot deploying and retracting structure of portable barbecue, comprises a barbecue body, a chassis and a supporting foot assembly, a cavity is formed in said chassis, said barbecue body is assembled in said cavity and provided with a first connecting part; the bottom of said cavity connects with a rotating component by pivot, said rotating component is provided with a second connecting part; said supporting foot assembly includes first supporting foot and second supporting foot and them connect with the bottom of said chassis by pivot; and when said first supporting foot and said second supporting foot rotate in a direction of closing to each other, said second connecting part will connect with said first connecting part fixedly. It can lock barbecue body while its supporting foot be retracted, which can minish storage space and will not be loose during transportation.

7 Claims, 3 Drawing Sheets

(58) Field of Classification Search
USPC .............................. 126/25 AA, 25 R, 9 R, 38
See application file for complete search history.

(56) References Cited

FOREIGN PATENT DOCUMENTS

| CN | 106308562 A | 1/2017 |
|---|---|---|
| CN | 206548369 U | 10/2017 |

* cited by examiner

SUPPORTING FOOT DEPLOYING AND RETRACTING STRUCTURE OF PORTABLE BARBECUE

CROSS-REFERENCE TO RELATED APPLICATIONS

This application is a continuation-application of PCT/CN2017/111287 filed with the Chinese Patent Office on 16 Nov. 2017. This application is based upon and claims the benefit of priority to Chinese Patent Application No. 201621233899.2 filed with the Chinese Patent Office on 17 Nov. 2016.

TECHNICAL FIELD

The present application relates to the field of barbecues, in particular, it relates to a supporting foot deploying and retracting structure of portable barbecue.

BACKGROUND

With the increase of outdoor activities, barbecues for outdoor barbecues are widely used, mainly comprises a barbecue body, a chassis and a supporting foot, the supporting foot is mounted in the bottom of the chassis to support the barbecues, the barbecue body is assembled on the chassis for barbecuing. The structure of existing barbecues is generally fixed and barbecues are usually very big, which cause the inconvenience to transport the barbecues. Some portable barbecues are folding by detachably, and then it takes some times to assemble after being carried to suburban. Additionally, there are some barbecues just to fold the barbecue body and chassis simply, and the supporting foots still occupy a large space; the barbecue body and the chassis are easy to be loose and fell apart from each other after folding, which also causes the inconvenience to transport.

SUMMARY

In order to overcome disadvantages of prior art, the present application provides a supporting foot deploying and retracting structure of portable barbecue, it can lock barbecue body while its supporting foot be retracted, which can minish storage space and will not be loose during transportation, and then it is convenient to be carried.

Said supporting foot deploying and retracting structure of portable barbecue is achieved by the following technical solutions:

A supporting foot deploying and retracting structure of portable barbecue, comprises a barbecue body, a chassis and a supporting foot assembly, a cavity is formed in said chassis, said barbecue body is assembled in said cavity and can move in the direction along the height of said cavity, said barbecue body is provided with a first connecting part; the bottom of said cavity connects with a rotating component by pivot, said rotating component is provided with a second connecting part, said second connecting part can connect with said first connecting part fixedly when said barbecue body moves to the bottom of said cavity; said supporting foot assembly includes first supporting foot and second supporting foot, the middle of said first supporting foot and the middle of said second supporting foot connect with the bottom of said chassis by pivot; when said first supporting foot rotates, said first supporting foot can drive said rotating component to rotate, and when said first supporting foot and said second supporting foot rotate in a direction of closing to each other, said first supporting foot can drive said second connecting part to move in a direction of closing to said first connecting part in order to make said second connecting part connect with said first connecting part fixedly.

Preferably, the bottom of said rotating component is provided with mounting slot, said first supporting foot is provided with a pivoting component which extends into said cavity, and said pivoting component is mounted in said mounting slot so that said rotating component can be driven to rotate by said first supporting foot.

Preferably, the inner wall of said mounting slot forms a mating surface, the outer wall of said pivoting component forms a driving surface, said driving surface is used for frictionally engaging with said mating surface when said first supporting foot rotates.

Preferably, said mating surface and said driving surface are square.

Preferably, the middle of said second supporting foot pivotally attaches with said pivoting component and pivotally cooperates with said pivoting component.

Preferably, said chassis is provided with a hole for limit position, said first supporting foot is provided with a limiting part, said limiting part is inlaid into said hole and can move in said hole.

Preferably, said first supporting foot is provided with a stopper part, said second supporting foot is provided with an contact part, when said limiting part slides to an end of said hole, said part will touch with said stopper part.

Preferably, said first connecting part is a slot which is set in the bottom of said barbecue body, said second connecting part is a hook which is set in the top of said rotating component.

Compared with the prior art, the present application has the advantages that: its barbecue body can be put into said cavity of said chassis, which makes the barbecue be folded initially; when supporting foot assembly is folded, i.e. when said first supporting foot and said second supporting foot rotate in a direction of closing to each other, said first supporting foot will drive said rotating component to rotate, and then make said second connecting part of said rotating component connect with said first connecting part of said barbecue body fixedly, so that this barbecue can lock barbecue body while its supporting foot be retracted, and then make this barbecue can be carried conveniently and its barbecue body will not come loose from said chassis.

Figure 1:
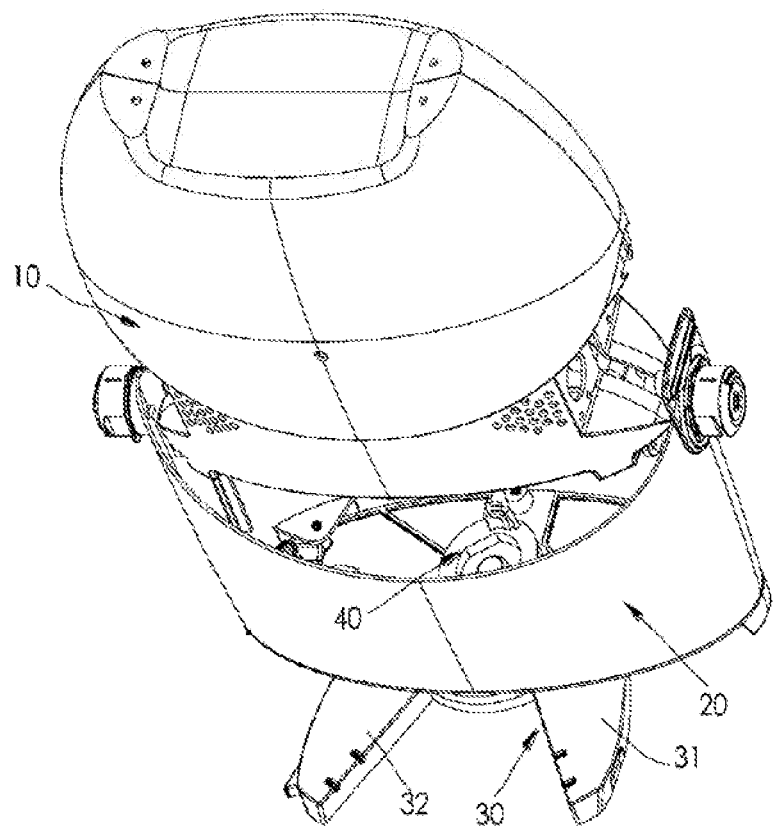
FIG. 1 is an overall structure diagram of a supporting foot deploying and retracting structure of portable barbecue.

In the drawings: 10, barbecue body; 20, chassis; 21, hole; 30, supporting foot assembly; 31, first supporting foot; 311, pivoting component; 312, limiting part; 313, driving surface; 32, second supporting foot; 40, rotating component; 41, hook; 42, mounting slot; 421, mating surface.

DESCRIPTION OF EMBODIMENTS

Embodiments of the present application are described in further detail.

The present application may be further illustrated in the following example embodiment, but examples are not limiting the scope of the present application.

Figure 2:
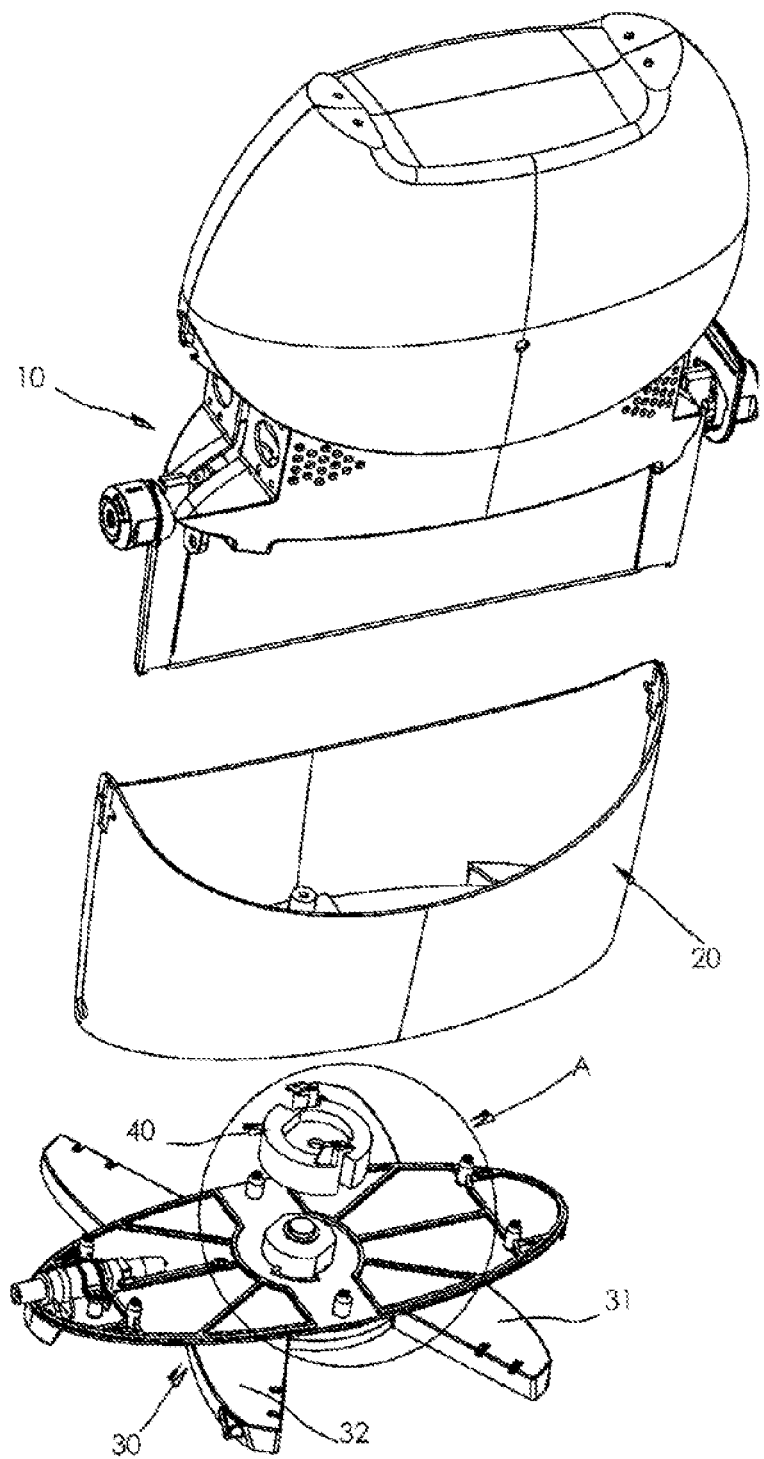
FIG. 2 is a decomposition structure diagram of a supporting foot deploying and retracting structure of portable barbecue.
Figure 3:
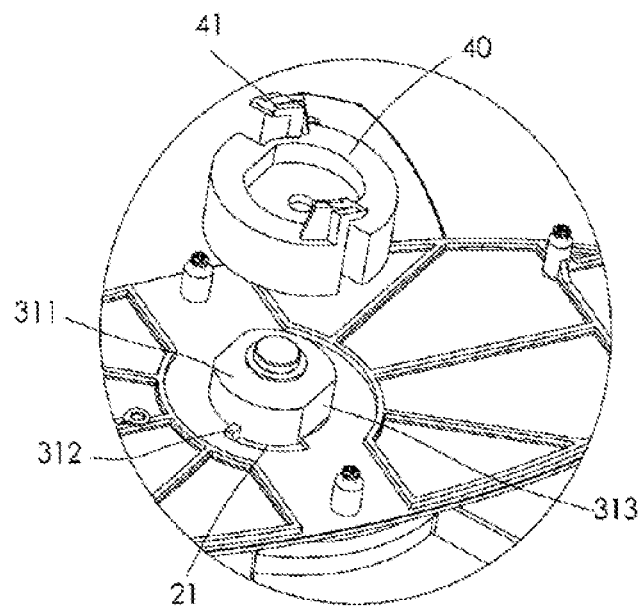
FIG. 3 is an amplified structure diagram of A in FIG. 2.
Figure 4:
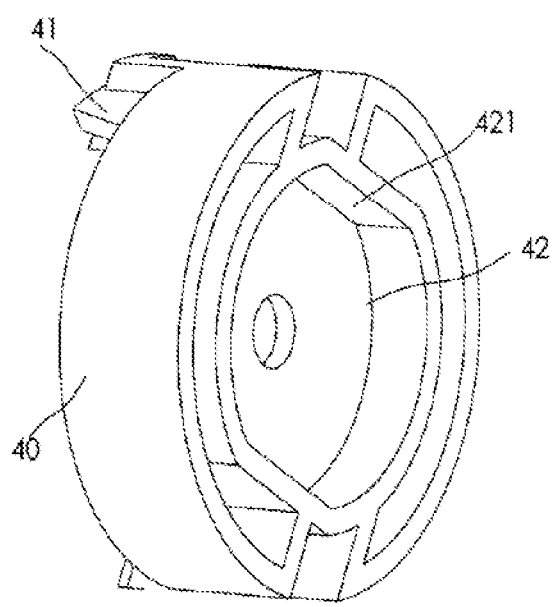
FIG. 4 is a structure diagram of a rotating component.

As shown in FIG. 1-FIG. 4, A supporting foot deploying and retracting structure of portable barbecue, comprises a barbecue body 10, a chassis 20 and a supporting foot assembly 30, a cavity is formed in said chassis 20, said barbecue body 10 is assembled in said cavity and can move in the direction along the height of said cavity, said barbecue body 10 is provided with a first connecting part; the bottom of said cavity connects with a rotating component 40 by pivot, said rotating component 40 is provided with a second connecting part, said second connecting part can connect with said first connecting part fixedly when said barbecue body 10 moves to the bottom of said cavity; said supporting foot assembly 30 includes first supporting foot 31 and second supporting foot 32, the middle of said first supporting foot 31 and the middle of said second supporting foot 32 connect with the bottom of said chassis 20 by pivot; when said first supporting foot 31 rotates, said first supporting foot 31 can drive said rotating component 40 to rotate, and when said first supporting foot 31 and said second supporting foot 32 rotate in a direction of closing to each other, said first supporting foot 31 can drive said second connecting part to move in a direction of closing to said first connecting part in order to make said second connecting part connect with said first connecting part fixedly.

On the basis of this structure, when the barbecue is folded, can make said barbecue body 10 move along the height direction of said cavity to the bottom of said cavity; when said barbecue body 10 moves to the bottom of said cavity, the user can make said first supporting foot 31 and said second supporting foot 32 rotate in a direction of closing to each other by manually, i.e. folding direction. During the rotation of said first supporting foot 31, said rotating component 40 is rotated by rotation of said first supporting foot 31, the rotation of said rotating component 40 will drive said second connecting part to move in a direction of closing to said first connecting part in order to make said second connecting part connect with said first connecting part fixedly, so that it can lock barbecue body 10 with said chassis 20 together while its supporting foot be retracted, which make the barbecue can be carried or transported conveniently. Of course, when the barbecue in the desired use, user can make said first supporting foot 31 and said second supporting foot 32 rotate in a direction of away from each other by manually, i.e. the direction of unfolding, similarly, said rotating component 40 will rotate during the rotation of said first supporting foot 31, which disengages said second connecting part from said first connecting part, and then make said barbecue body 10 move along the height direction of said cavity to the top of said cavity in order to unfold the barbecue.

In addition, it should be noted, in the present embodiment, after said first supporting foot 31 and said second supporting foot 32 rotate in a direction of away from each other, said first supporting foot 31 and said second supporting foot 32 will stretch to outside said barbecue body 10, it is to say that the support endpoint of said first supporting foot 31 and the support endpoint of said second supporting foot 32 respectively locate in both sides of the center of gravity of said barbecue body 10, so that can keep said barbecue body 10 be stable without tipping.

Preferably, the bottom of said rotating component 40 is provided with mounting slot 42, said first supporting foot 31 is provided with a pivoting component 311 which extends into said cavity, and said pivoting component 311 is mounted in said mounting slot 42 so that said rotating component 40 can be driven to rotate by said first supporting foot 31. Concretely, said pivoting component 311 is inlaid into said mounting slot 42. Further, the inner wall of said mounting slot 42 forms a mating surface 421, the outer wall of said pivoting component 311 forms a driving surface 313, said driving surface 313 is used for frictionally engaging with said mating surface 421 when said first supporting foot 31 rotates, so that, when said pivoting component 311 rotates, said rotating component 40 can rotate with the rotation of said pivoting component 311 because said driving surface 313 can frictionally engage with said mating surface 421.

In order to increase the driving force of said pivoting component 311, the shapes of said mating surface 421 and said driving surface 313 are square which make a larger frictional force with each other, and then have a better driving effectiveness.

Of course, to make said pivoting component 311 and said mounting slot 42 have an interference fit, can also achieve the same effectiveness. While in the other cases, to make said rotating component 40 fixedly connect with said first supporting foot 31, said rotating component 40 can rotates when said first supporting foot 31 rotates.

Preferably, the middle of said second supporting foot 32 pivotally attaches with said pivoting component 311 and pivotally cooperates with said pivoting component 311, which is easy to install and is also convenient for the relative rotation of said first supporting foot 31 and said second supporting foot 32. In addition, in the present embodiment, a bolt can be screwed into the middle of said rotating component 40 and the bolt is screwed into said pivoting component 311 at the same time, so that can achieve the installation of said rotating component 40, said first supporting foot 31 and said second supporting foot 32, and said rotating component 40, said first supporting foot 31 and said second supporting foot 32 can take this bolt as a rotating shaft to rotates.

Preferably, said chassis 20 is provided with a hole 21 for limit position, said first supporting foot 31 is provided with a limiting part 312, said limiting part 312 is inlaid into said hole 21 and can move in said hole 21, so when said first supporting foot 31 rotates, said limiting part 312 will slide within said hole 21; when said limiting part 312 moves to an end of said hole 21, said first supporting foot 31 is in a limit position that it can rotate; this structure can avoid the rotation angle of said first supporting foot 31 to be excessive.

Further, said first supporting foot 31 is provided with a stopper part, said second supporting foot 32 is provided with an contact part, when said limiting part 312 slides to an end of said hole 21, said contact part will touch with said stopper part, so that can limit the rotation of said second supporting foot 32; this structure can avoid the rotation angle of said second supporting foot 32 to be excessive.

Preferably, in the present embodiment, said first connecting part is a slot which is set in the bottom of said barbecue body 10, said second connecting part is a hook 41 which is set in the top of said rotating component 40; when said rotating component 40 rotates, said hook 41 will stick into said slot and then fix said barbecue body 10 in said chassis 20.

The embodiment of the present application described above is just a preferred embodiment, it is not just limited to the above embodiment, any other change, like modifications, substitutions, combinations, simplification, made in the present application does not depart from the spirit and principles, shall be equivalent replacement and included within the scope of the present application.

The invention claimed is:

1. A supporting foot deploying and retracting structure of portable barbecue, comprises a barbecue body, a chassis, and a supporting foot assembly, a cavity is formed in said chassis, said barbecue body is totally received and assembled in said cavity and moves in the direction along a height of said cavity, said barbecue body is provided with a first connecting part; a bottom of said cavity connects with a rotating component, said rotating component is provided with a second connecting part, said second connecting part connects with said first connecting part fixedly when said barbecue body moves to the bottom of said cavity; said supporting foot assembly includes a first supporting foot and a second supporting foot, a middle of said first supporting foot and a middle of said second supporting foot connect with the bottom of said chassis; when said first supporting foot rotates, said first supporting foot drives said rotating component to rotate, and when said first supporting foot and said second supporting foot rotate in a direction of closing to each other, said first supporting foot drives said second connecting part to move in a direction of closing to said first connecting part in order to make said second connecting part connect with said first connecting part fixedly, wherein the bottom of said rotating component is provided with a mounting slot, said first supporting foot is provided with a pivoting component which extends into said cavity, and said pivoting component is mounted in said mounting slot so that said rotating component be driven to rotate by said first supporting foot.

2. The supporting foot deploying and retracting structure of portable barbecue as mentioned in claim 1, wherein the inner wall of said mounting slot forms a mating surface, the outer wall of said pivoting component forms a driving surface, said driving surface is used for frictionally engaging with said mating surface when said first supporting foot rotates.

3. The supporting foot deploying and retracting structure of portable barbecue as mentioned in claim 2, wherein said mating surface and said driving surface are square.

4. The supporting foot deploying and retracting structure of portable barbecue as mentioned in claim 1, wherein the middle of said second supporting foot pivotally attaches with said pivoting component and pivotally cooperates with said pivoting component.

5. The supporting foot deploying and retracting structure of portable barbecue as mentioned in claim 1, wherein said chassis is provided with a hole for limit position, said first supporting foot is provided with a limiting part, said limiting part is inlaid into said hole and moves in said hole.

6. The supporting foot deploying and retracting structure of portable barbecue as mentioned in claim 5, wherein said first supporting foot is provided with a stopper part, said second supporting foot is provided with a contact part, when said limiting part slides to an end of said hole, said contact part will touch with said stopper part.

7. The supporting foot deploying and retracting structure of portable barbecue as mentioned in claim 1, wherein said first connecting part is a slot which is set in the bottom of said barbecue body, said second connecting part is a hook which is set in the top of said rotating component.

\* \* \* \* \*